(12) United States Patent
Foster et al.

(10) Patent No.: US 7,209,444 B2
(45) Date of Patent: Apr. 24, 2007

(54) METHODS AND DEVICES FOR BALANCING COMMUNICATIONS USING MATCH RATES

(75) Inventors: Robin Harris Foster, Little Silver, NJ (US); Jeffrey H. Hagan, Phoenix, AZ (US)

(73) Assignee: Avaya Technology Corp., Basking Ridge, NJ (US)

( * ) Notice: Subject to any disclaimer, the term of this patent is extended or adjusted under 35 U.S.C. 154(b) by 951 days.

(21) Appl. No.: 10/145,030

(22) Filed: May 15, 2002

(65) Prior Publication Data

US 2003/0214950 A1    Nov. 20, 2003

(51) Int. Cl.
*H04L 12/26* (2006.01)
*H04L 1/00* (2006.01)

(52) U.S. Cl. .................... 370/235; 370/230.1; 370/231
(58) Field of Classification Search ........... 370/395.32, 370/229–231, 235
See application file for complete search history.

(56) References Cited

U.S. PATENT DOCUMENTS

| | | | |
|---|---|---|---|
| 5,206,903 A | | 4/1993 | Kohler et al. |
| 5,506,898 A | | 4/1996 | Costantini et al. |
| 5,530,744 A | * | 6/1996 | Charalambous et al. .... 379/265 |
| 5,740,238 A | | 4/1998 | Flockhart et al. |
| 5,754,639 A | | 5/1998 | Flockhart et al. |
| 5,828,747 A | | 10/1998 | Fisher et al. |
| 5,870,464 A | | 2/1999 | Brewster et al. |
| 6,049,547 A | | 4/2000 | Fisher et al. |
| 6,058,435 A | | 5/2000 | Sassin et al. |
| 6,064,973 A | | 5/2000 | Smith et al. |
| 6,070,142 A | | 5/2000 | McDonough et al. |
| 6,134,530 A | * | 10/2000 | Bunting et al. ................. 705/7 |
| 6,233,165 B1 | | 5/2001 | Irissou et al. |
| 6,295,353 B1 | | 9/2001 | Flockhart et al. |
| 6,314,465 B1 | * | 11/2001 | Paul et al. .................. 709/226 |
| 2003/0005040 A1 | * | 1/2003 | Kukkal ...................... 709/203 |
| 2003/0099205 A1 | * | 5/2003 | Lee et al. .................... 370/252 |

* cited by examiner

*Primary Examiner*—Chi Pham
*Assistant Examiner*—Ronald Abelson

(57) ABSTRACT

Incoming communications received by call centers and the like are routed to one or more alternative call centers based on a comparison of Match Rates and Expected Wait Times. Such routing helps improve the overall load balancing of a call center or network of call centers while increasing the effectiveness and controlling the costs of handling incoming communications.

26 Claims, 3 Drawing Sheets

Fig. 3

| Call Center | Desired Match Rate | Present Match Rate | Wait Time | Wait Time Adj.' Factor | Adj. Wait Time | Route Yes/No? |
|---|---|---|---|---|---|---|
| Original | 90% | 85% | 30 sec. | 0-5% - 10 sec. 6-10% - 5% sec. Above 10% - 1sec. | n/a | n/a |
| Alt.' A | — | — | 25 sec. | Same as Original | 35 sec. | No |
| | | | | | 30 sec. | Yes |
| | | | | | 26 sec. | Yes |
| Alt.' B | — | — | 15 sec. | Same as Original | 25 sec. | Yes |
| | | | | | 20 sec. | Yes |
| | | | | | 16 sec. | Yes |

METHODS AND DEVICES FOR BALANCING COMMUNICATIONS USING MATCH RATES

BACKGROUND OF THE INVENTION

Many businesses today have offices in more than one location. For example, a large corporation may have its corporate headquarters in New York, manufacturing facilities in Virginia and research and development laboratories in California. As a result, a businesses' employees may be spread out as well. Many businesses have purchased equipment and associated software referred to as "call centers" or ("contact centers"). Generally speaking, a call center is used to distribute incoming "calls (hereafter the word "call" or "calls" is used to indicate any number of incoming communications or communication types, such as voice calls, voice mail, facsimile, voice-over-IP, emails, instant messages, Internet-based web chats, collaborative Internet sessions, or any other type of incoming communication that can be handled by a customer service representative or the like) to a business' employees. Call centers have become more sophisticated over the years. Today, some call centers have the ability to route an incoming call to an employee who has a specialized skill or expertise in order to answer/satisfy the specialized questions/needs of incoming callers.

A business may have more than one call center linked together. For example, each such "multi-site" call center might be responsible for distributing calls to a particular subset of employees who have specific skills or expertise. An advantage of having a linked arrangement of call centers is that when an incoming call is received by one call center, and this "original" call center determines that the available employees (referred to as "agents") connected to it do not have the requisite skills or expertise to meet the needs of the incoming call in a timely fashion, the original call center can route the call to an "alternative" call center that is capable of promptly directing the call to a qualified, available agent. In general, it is preferable to place incoming calls into a "queue" associated with a center which has a short wait time, rather than a long wait time, in order to enhance customer satisfaction and reduce the chance that callers will hang up before an agent answers the call.

When caller wait time is the chief concern, many conventional call centers use techniques that change how work is handled in order to reduce wait time. For example, in some cases calls are moved from one "queue" to another, where wait times are expected to be shorter or where agents are available to take the call immediately. The agent that services such a "re-queued" caller, however, is typically not the first choice in agent type (i.e., does not have the ideal abilities or specialized knowledge needed to answer a caller's question), and, therefore, may provide a service which is less efficient, less effective, or costs more than an agent who is more ideally suited to service this type of call.

The criteria to determine whether a call should be routed to another call center and/or which call center, among many, should be the target of the routed call, vary. Increasingly, some businesses want to use a criterion called "Match Rate". So it is clear, many techniques for routing calls can involve a transaction in which one value or criteria is matched with another. See for example, U.S. Pat. No. 5,206,903 to Kohler, et. al assigned to the same assignee herein. It should be emphasized, however, that as used herein, the term "Match Rate" has a different and more specialized meaning. Specifically, as used herein, the term Match Rate should be understood as a cumulative measurement (i.e., a "running tally"), instead of a successful "match" of caller or call to agent. More specifically, the Match Rate to which the present invention is directed is a measurement of what percentage of calls needing a particular skill or expertise set are answered by agents who are ideally suited to serve the contact, rather than by agents who are less than ideally suited to do so.

Some existing techniques route calls to agents based on a set of skills. Others are capable of selecting a queue with the shortest wait time served by qualified agents from among many queues in order to minimize wait times. The latter techniques are sometimes referred to as "load balancing" techniques.

To date, however, the inventors are not aware of a technique which allows calls to be balanced based on a combination of wait times and a Match Rate.

Accordingly, it is a desire of the present invention to provide for methods and devices for balancing calls, such as incoming calls, based on a Match Rate and wait times.

It is a further desire of the present invention to balance calls based on a Match Rate and wait times which is associated with a particular set of skills or expertise.

Further desires will become apparent from the drawings, detailed description of the invention and claims which follow.

SUMMARY OF THE INVENTION

In accordance with the present invention there are provided methods and devices for load balancing communications, more specifically incoming calls. As envisioned by the present invention, a Match Rate and an estimated wait time ("EWT") platform are adapted to make comparisons of present and desired Match Rates and present and adjusted EWTs. Based on the results of these two comparisons, an incoming call may, or may not be, routed to one or more alternative cell centers.

BRIEF DESCRIPTION OF THE DRAWINGS

FIG. 3 depicts an exemplary table of values used to balance calls among call centers and the like according to embodiments of the present invention.

DETAILED DESCRIPTION OF THE INVENTION

Figure 1:
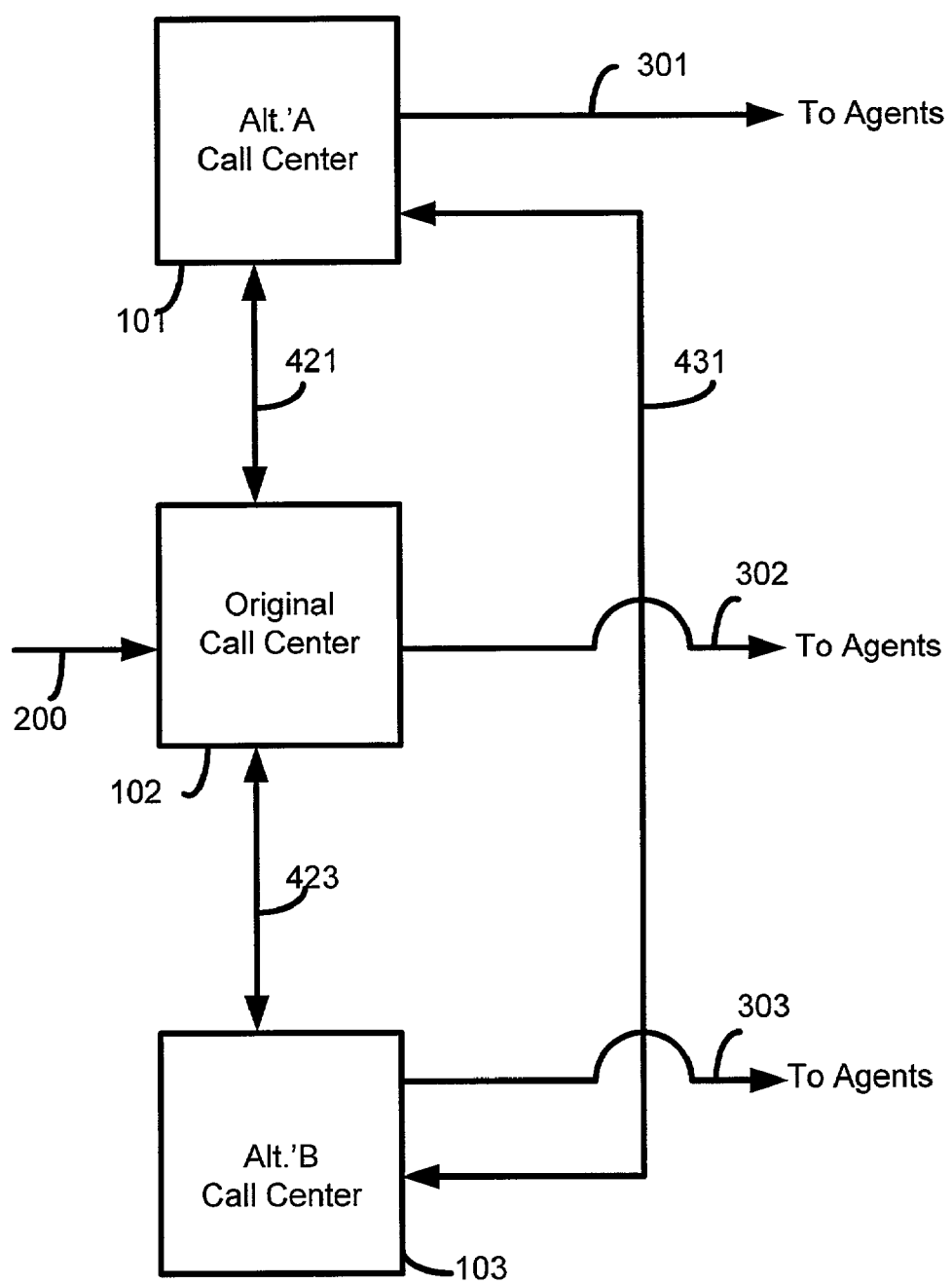
FIG. 1 depicts a simplified block diagram of a multi-site call center network.

Referring now to FIG. 1, three conventional call centers are represented simply by units 101–103. Call center 102 is designated an original call center while the two remaining call centers are designated as "alternatives" (abbreviated "alt.") 101, 103. As shown, an incoming call is received by the original call center 102 via pathway 200. The original call center 102 is capable of forwarding or distributing the incoming call to agents that are connected to the call center 102 via pathway 302 or, alternatively, the original call center 102 may route the incoming call to one of the alternative call centers 101, 103 via pathways 421 or 423. Once received, alternative call centers 101, 103 may forward the call to an agent that is connected to such a call center via pathways 301, 303.

Figure 2:
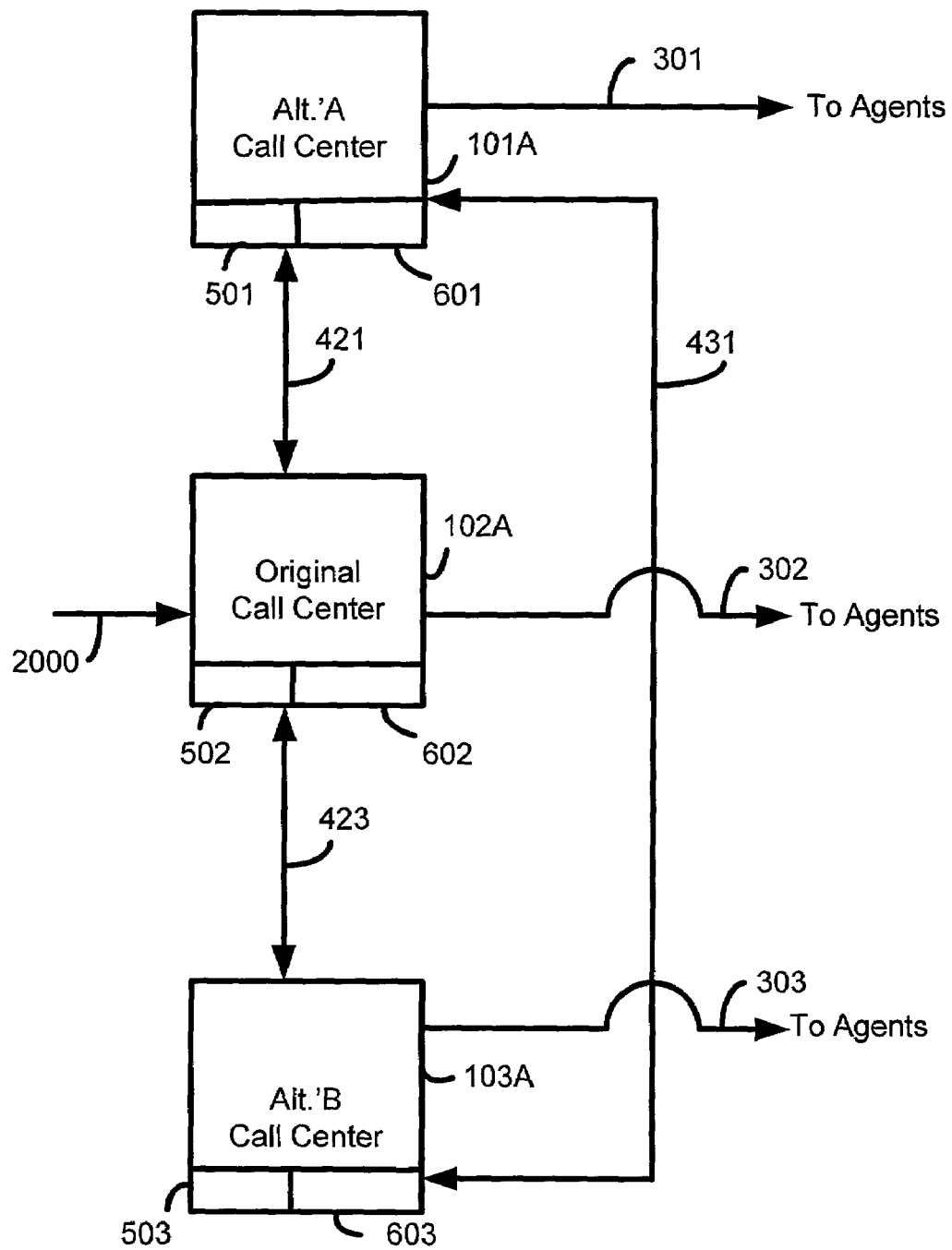
FIG. 2 illustrates a simplified example of a technique that uses a Match Rate to balance calls among call centers and the like according to one embodiment of the present invention.

Referring now to FIG. 2, there is shown devices 100A, 102A and 103A for balancing communications according to one embodiment of the present invention. As indicated in FIG. 2, devices 101A–103A comprise call centers, with device 102A comprising an original call center and devices 101A and 103A comprising alternate call centers.

Comparing FIG. 1 with FIG. 2, it can be seen that the devices 101A–103A in FIG. 2 comprise Match Rate platforms 501–503 and EWT platforms 601–603 while the devices 101–103 in FIG. 1 do not. It is these platforms that provide the devices 101A–103A with the capability of balancing incoming communications using a Match Rate. It should be understood that the platforms 501–503, 601–603 may comprise hardware, firmware, software and databases or the like or some combination of the just mentioned elements. It should be further understood that a platform may be downloaded from an external source into the devices 101A–103A using any number of techniques. Though shown as two platforms it should be understood that these maybe combined into one or further broken down into more than two platforms.

To simplify the explanation which follows, the Match Rate platforms 501–503, 601–603 will take the form of a programmed medium, such as any type of memory or control device, which has been programmed to carry out the features and functions described in more detail below. That said, it should be understood that these platforms may comprise one part of a call center, router or the like.

One example of how the platforms 501–503, 601–603 operate to meet the desires of the present invention is as follows. At some point an incoming communication (e.g., telephone call) is sent via pathway 2000 to original call center 102A. Prior to, or substantially at the same time as, receiving the incoming call the original call center, via Match Rate platform 502, is adapted to calculate its "present" Match Rate. This Match Rate is a performance value which indicates how often (e.g., using a percentage) incoming calls received by the original call center 102A were connected to agents (e.g. employees, out-sourced employees, outside consultants, etc. . . . ) who are ideally suited to answer questions posed by the incoming caller. In an illustrative embodiment of the present invention, each Match Rate platform 501–503 is adapted to calculate and maintain a "running" or real-time value indicating its own present Match Rate over a set of completed calls. The set of completed calls might be the last 30 calls, or the calls arriving in the last 30 minutes, and may be a simple calculation or a weighted calculation (e.g., exponentially weighted calculations).

Ideally, every incoming caller would be connected to an agent who has an ideal skill set (which includes one or more skills/values) or expertise matching the needs of the incoming caller. Realistically, because at any time the number of calls may greatly outnumber the number of calls that such an ideal agent can serve in a timely manner, is not always possible for the center to serve callers using only ideal agents. When this occurs, centers begin to route calls to less than ideal agents, such as agents with less proficiency in a particular task or one associated with a higher cost. So, for example, at any point in time the present Match Rate for a given type of call within a call center may be seventy percent, meaning that the center has relied upon less ideally qualified agents to service 30% of the incoming calls.

In an illustrative embodiment of the present invention, a business that owns or operates call centers 101A–103A may employ an administrator or manager to operate, program or monitor the centers 101A–103A. According to the present invention, an administrator may input, and later adjust, a "desired" Match Rate value into the Match Rate platform of a call center.

For example, an administrator may input a desired Match Rate into the original call center 102A of ninety percent. In an illustrative embodiment of the present invention, after an incoming call has been received and the present Match Rate of original call center 102A has been calculated, the Match Rate platform 502 is further adapted to compare the present, calculated Match Rate to the desired Match Rate of original call center 102A. This comparison is done in order to determine whether the call center is meeting the requirements of the business or organization. If the present Match Rate is eighty-five percent and the desired Match Rate is ninety percent then the number of incoming calls that are connected to an ideally specialized agent is within five percent (90−85=5) of the business' goals. Though the above example is based on percentages, various other measurement scales may be used by a business, (e.g., basis points or some other type of point system).

In addition to making sure that an ideal agent is connected to each incoming call, businesses must also insure that this is done in a timely fashion. If the right agent is connected one hundred percent of the time but it takes a relatively long time to do so, a business may lose customers because many of the incoming callers will hang up or terminate their call. Businesses must strike a balance between connecting an incoming call to the correct agent with the need to connect the incoming caller to any agent within a reasonable amount of time. To shorten a longer than acceptable wait time, a center may begin to use less than ideal agents, causing its Match Rate to drop. As its wait time decreases, the use of less than ideal agents can be discontinued, allowing its Match Rate to increase because only ideal agents are used.

With this in mind, devices envisioned by the present invention are also adapted to calculate an expected wait time ("EWT"). Thus, each device 101A–103A is capable of calculating a present Match Rate and a present EWT at any given point in time. Such EWT's may be calculated by a Match Rate platform 501–503 or by an EWT platform 601–603. That is to say both functions maybe carried by one or more platforms. EWTs can be calculated using various techniques, some of which are disclosed in U.S. Pat. No. 5,506,898 to Constantine, et. al., U.S. Pat. No. 5,754,639 to Flockhart et. al.; and U.S. Pat. No. 5,740,238 to Flockhart et. al. all assigned to the same assignee as herein.

Suppose in our example the EWT of original call center 102A is thirty seconds. As envisioned by the present invention, original call center 102A is adapted to route incoming calls received via pathway 2000 to an alternative call center only after considering how close to its desired Match Rate it has come and only after comparing its present EWT for an ideal type of agent with adjusted EWTs for an ideal type of agent at alternative call centers 101A, 103A. As envisioned by the present invention, the closer the present Match Rate is to a desired Match Rate the less likely it is that an original call center will route calls to an alternative call center and vice-versa. That is, if a call center is meeting its Match Rate it will only route calls to an alternative call center if the EWT of the alternative call center is substantially better than the EWT of the original call center. The rationale for this is as follows. If a given, original call center is meeting its Match Rate goals the chances are that it is capable of handling the type and volume of incoming calls it is receiving and, therefore, there is less need to route calls to alternative call centers. For this reason, unless an alternative call center has a substantially shorter EWT which will benefit the caller, there is no reason to route a call there.

In one embodiment of the present invention, a business could employ a common goal for its Match Rate for a given type of call at any center that serves that type of call. For example, sales calls from important customers would have a Match Rate goal of 85% at every center. Different types of calls can have different Match Rate goals. The Match Rate goal for service calls might be 70%. Taking this into consideration, in accordance with one embodiment of the present invention, each device 101A–103A is adapted to select "adjustment factors" depending on how close or how far its present Match Rate is to its desired Match Rate. This adjustment factor will be added to the EWT of an alternative call center. For example, if original call center 102A is within five percent of its desired Match Rate, platform 502 or 602 may be adapted to select an adjustment factor of ten seconds. This adjustment factor will be added to the EWTs of both alternative call centers 101A and 103A. If the present EWT of call center 101A is twenty-five seconds and that of alternative call center 103A is fifteen seconds, then the adjusted, EWTs of alternative call centers 101A, 103A are thirty-five and twenty-five seconds, respectively.

In an illustrative embodiment of the present invention, device 102A via platform 502 or 602 may be adapted to first query or retrieve the present EWTs of alternative call centers 101A–103A. Upon receiving the present EWTs of the alternative call centers 101A, 103A the device 102A may be adapted to add the adjustment factor to the present EWTs. Upon calculating the adjusted, EWTs of the alternative call centers 101A, 103A, the device 102A using platform 502 or 602 is further adapted to compare these adjusted, EWTs to the present EWT of call center 102A. In this instance, the present EWT of call center 102A is thirty seconds. Comparing this value to the adjusted EWTs of alternative call centers 101A and 103A it can be seen that the adjusted EWT of alternative call center 101A is greater (35–30), while the adjusted EWT of alternative call center 103A is less (30–25), than the present EWT of original call center 102A. In this example, original call center 102A would not route an incoming call to the alternative call center 101A because its adjusted EWT is greater than the present EWT of original call center 102A. On the other hand, original call center 102A may route an incoming call to alternative call center 103A because its adjusted EWT is less than the present EWT of original call center 102A.

In sum, an incoming call is routed to an alternative call center only if the adjusted EWT of the alternative call center is substantially less than the present EWT of the original call center which received the incoming call when the Match Rate in the original center is meeting or exceeding its goal. When the original center's Match Rate is below its goal, calls will be relocated for much less improvement in wait time, in order to improve the Match Rate as explained below shortly. It should be understood that by "substantial" is meant any value which fits the goals of the particular business or organization. In the example used above an adjusted EWT which was five seconds less than a present EWT was substantial enough. Each organization or business will have its own concerns about caller wait time for various types of calls and will set its thresholds accordingly for each type of call. What is a substantial amount of time for one business or organization may not be a substantial amount of time for another. Therefore, it should be understood that the devices 101A–103A and/or platforms 501–503, 601–603 may be adapted to select any number of adjustment factor ranges. That is, the devices envisioned by the present invention give the administrator of a business or organization the capability of entering any range of adjustment factors.

The example above assumed that the present Match Rate of the original call center fell within five percent of the desired Match Rate. Suppose, however, that this is not the case. Instead, suppose the actual Match Rate was eighty percent or seventy percent. In this case, the devices and platforms envisioned by the present invention may be adapted to select a different adjustment factor. For example, when the present Match Rate is six to ten percent from a desired Match Rate, platforms 501–503 may be adapted to select an adjustment factor of five seconds. When the present Match Rate is more than ten percent from the desired Match Rate the platforms and devices envisioned by the present invention may be adapted to select an adjustment factor of one second. In can be seen from these examples that the devices and platforms envisioned by the present invention select increasingly smaller adjustment factors the farther a device or call center is its below Match Rate goal, and vice-versa. The rationale for this is as follows. If a device or call center is not meeting its Match Rate it may be because the volume of calls it is handling is too great or the type of agents connected to it do not have the expertise or specialized skills required by the calls it is receiving. Realizing this, the present invention seeks to route those calls to an alternative call center. In this case, the priority is on matching an incoming caller to the most ideally suited agent. Therefore, an alternative call center which has an appropriate agent need not have an EWT which is substantially better than the original call center. Using our example above, if the original call center 102A maintained a present EWT of thirty seconds but its present Match Rate dropped to eighty percent, center 102A would be adapted to add an adjustment factor of only five seconds to the EWTs of alternative call centers 101A and 103A. This would make the adjusted EWTs of alternative call centers 101A, 103A thirty and twenty seconds, respectively. Assuming that both call centers had more qualified agents, the original call center 102A could be adapted to route calls to either alternative call center 101A or 103A because the adjusted EWTs of thirty and twenty-five are equal to, or less than, the present EWT of original call center 102A.

In the case where the present Match Rate of original call center 102A is only seventy percent, platform 502 or 602 would be adapted to only add an adjustment factor of one second to the actual EWTs of alternative call center 101A, 103 making the adjusted EWTs of those call centers twenty-six and sixteen seconds, respectively. Under this scenario, because both adjusted EWTs are again less than the present EWT of original call center 102A, platform 502 or 602 can be adapted to route incoming calls to either alternative call center.

Again, the Match Rates, EWTs and adjustment factors mentioned above are for illustration purposes only. These values will vary from business to business, organization to organization and by communication type. For example, the same business may set different Match Rates (i.e., adjust the Match Rate) depending on whether the incoming call is a voice call, facsimile, email, etc. The present invention envisions devices and platforms which are capable of operating using any number of adjustment factors. Said another way, the present invention envisions giving the administrators or operators of devices 101A–103A the ability to set (e.g., input) any number of adjustment factors they see fit based on the EWTs and Match Rates which are acceptable to their business, organization or communication type.

FIG. 3 depicts a table which summarizes the examples given above. The last column bears the heading "Route, YES/NO?". This column indicates whether the incoming call should or should not be routed to an alternative call center.

It should be understood that although three call centers 101A–103A are shown in FIG. 2, that the present invention is not limited to such a configuration or network. Rather, a fewer or greater number of call centers, each with its own Match Rate platform, is envisioned by the present invention. In addition, any of the call centers 101A–103A may be used as an original or alternative call center.

It should also be understood that more than one Match Rate may be used. That is, an organization may have one Match Rate for its sales organization and another for its technical support organization. In an alternative embodiment of the present invention, each device 101A–103A or platforms 501–503, 601–603 may be adapted to route calls using one or more Match Rates.

Some organizations or businesses may only wish to use a Match Rate when their call volumes are relatively high. This is because when call volumes are low there is less of a chance that a call center will be overwhelmed or will not be able to connect an incoming call to an appropriate agent. Taking this into consideration, in an alternative embodiment of the present invention devices 101A–103A and platforms 501–503, 601–603 may be adapted to route calls to alternative call centers only when an incoming call volume reaches a certain threshold. That is, platforms 501–503, 601–603 may be adapted to operate only upon the detection of a threshold call volume, a value of which may be set by an administrator. As with the Match Rate used, the threshold used may be adjusted or varied depending on the type of communication (e.g., voice, facsimile, email, etc. . . . ).

In yet a further embodiment of the present invention, the decision to route a call to an alternative call center based on a Match Rate and an adjusted EWT may be overridden in specific instances. For example, even if original call center 102A determines that alternative call center 101A has an adjusted EWT which is greater than its EWT and, therefore, it would not route a call to the alternative call center 101A, this decision may be overridden if the original call center 102A receives an override instruction from alternative call center 101A. Such an override or interrupt may be sent by alternative call center 101A if, and when, call center 101A detects that a highly specialized agent is available to handle a particular type of call (e.g., the agent becomes available before the next comparison of Match Rates and EWTs can occur). In this case, an incoming call in need of such expertise would be routed by original call center 102A to alternative call center 101A even though the adjusted EWT of the alternative call center 101A is substantially outside the threshold where such a call would normally be routed.

The above discussion has sought to give some examples of the ideas envisioned by the present invention. By no means is the discussion above intended to be an exhaustive list of examples. Others can be envisioned without departing from the spirit and scope of the present invention. The proper scope of the present invention is defined by the claims which follow:

We claim:

1. A device for load balancing an incoming communication comprising:
    a Match Rate platform adapted to calculate a present Match Rate and to compare the present Match Rate to a desired Match Rate; and
    an expected wait time (EWT) platform adapted to calculate a present EWT and to compare the present EWT to at least one adjusted EWT,
    where an incoming call is routed to an alternative device based on the results of the Match Rate and EWT comparisons.

2. The device as in claim 1 wherein the incoming communication is selected from the group consisting of voice, voicemail, facsimile, voice-over-IP, email, instant messages, web chats, and collaborative Internet communications.

3. The device as in claim 1 wherein the incoming communication is routed to the alternative device when the present Match Rate is equal to or greater than the desired Match Rate and when the adjusted EWT is substantially less than the present EWT.

4. The device as in claim 1 wherein the incoming communication is routed to the alternative device when the present Match Rate is less than the desired Match Rate and when the adjusted EWT is less than the present EWT.

5. The device as in claim 1 where in the EWT platform is further adapted to calculate the adjusted EWT by adding an adjustment factor to an alternative device's present EWT.

6. The device as in claim 5 wherein the EWT platform is further adapted to select the adjustment factor based on the Match Rate comparison.

7. The device as in claim 6 wherein the EWT platform is further adapted to select an increasingly smaller adjustment factor, the further the present Match Rate is below the desired Match Rate.

8. The device as in claim 1 wherein the desired Match Rate comprises an adjustable value.

9. The device as in claim 1 wherein the platforms are further adapted to operate upon detection of an adjustable threshold call volume.

10. The device as in claim 9 wherein the threshold call volume is input by an administrator.

11. The device as in claim 1 wherein the incoming communication is routed to the alternative device before the comparisons can occur upon receipt of an override signal.

12. The device as in claim 1 wherein each of the device and alternative device comprises a call center.

13. The device as in claim 1 wherein the device comprises a programmable device.

14. The device as in claim 1 wherein the present Match Rate is a real-time value indicating how often incoming calls are connected to agents ideally suited to answer questions posed by an incoming caller over a set of completed calls.

15. A method for load balancing an incoming communication comprising:
    calculating a present Match Rate and comparing the present Match Rate to a desired Match Rate;
    calculating a present expected wait time (EWT) and comparing the present EWT to at least one adjusted EWT; and
    routing an Incoming call to an alternative device based on the results of the Match Rate and EWT comparisons.

16. The method as in claim 15 further comprising routing the incoming call to the alternative device when the present Match Rate is equal to or greater than the desired Match Rate and when the adjusted EWT is substantially less than the present EWT.

17. The method as in claim 15 further comprising routing the incoming call to the alternative device when the present Match Rate is less than the desired Match Rate and when the adjusted EWT is less than the present EWT.

18. The method as in claim 15 further comprising calculating the adjusted EWT by adding an adjustment factor to an alternative device's present EWT.

19. The method as in claim 15 further comprising selecting the adjustment factor based on the Match Rate comparison.

20. The method as in claim 19 further comprising selecting an increasingly smaller adjustment factor the further the present Match Rate is below the desired Match Rate.

21. The method as in claim 15 wherein the desired Match Rate comprises an adjustable value.

22. The method as in claim 21 further comprising inputting the adjustable value using an administrator.

23. The method as in claim 15 wherein the calculations are carried out upon detection of an adjustable threshold call volume.

24. The method as in claim 23 further comprising inputting the adjustable call volume using an administrator.

25. The method as in claim 15 further comprising routing the incoming call to an alterative device before the comparisons can occur upon receipt of an override signal.

26. The method as in claim 15, further comprising calculating a real-time value indicating how often incoming calls are connected to agents ideally suited to answer questions posed by an incoming caller over a set of completed calls.

* * * * *